United States Patent [19]

Shoemaker et al.

[11] 4,137,356
[45] Jan. 30, 1979

[54] NON-SKID PLACE MAT AND THE LIKE

[75] Inventors: Charles T. Shoemaker; Joseph P. Engler, both of Oshkosh, Wis.

[73] Assignee: The Hoffmaster Company, Inc., Oshkosh, Wis.

[21] Appl. No.: 844,903

[22] Filed: Oct. 25, 1977

[51] Int. Cl.² .................. B32B 3/00; B32B 29/00
[52] U.S. Cl. .................. 428/211; 248/346.1; 428/178; 428/314; 428/511; 428/537
[58] Field of Search .......... 428/211, 511, 132, 133, 428/134, 136, 140, 314, 178, 537; 248/346.1; 4/185 F; 238/14

[56] References Cited

U.S. PATENT DOCUMENTS

| 262,452 | 8/1882 | McLean | 428/132 |
| 1,167,603 | 1/1916 | Swift | 428/132 |
| 2,809,145 | 10/1957 | McDermott | 428/140 X |
| 3,553,068 | 1/1971 | Coale | 428/178 X |
| 3,741,411 | 6/1973 | Peacock | 428/178 X |

*Primary Examiner*—Thomas J. Herbert, Jr.
*Attorney, Agent, or Firm*—Cooper, Dunham, Clark, Griffin & Moran

[57] ABSTRACT

A place mat, coaster or the like possessing exceptional anti-skid characteristics comprises a planar base member, such as paper or plastic sheet, provided on the top and bottom surfaces thereof with a plurality of arrayed, discrete, spaced-apart projections of a high friction material. Such place mats, coasters and the like are produced by imprinting the aforementioned high friction material in the desired pattern or array on the top and bottom surfaces of the base member.

2 Claims, 4 Drawing Figures

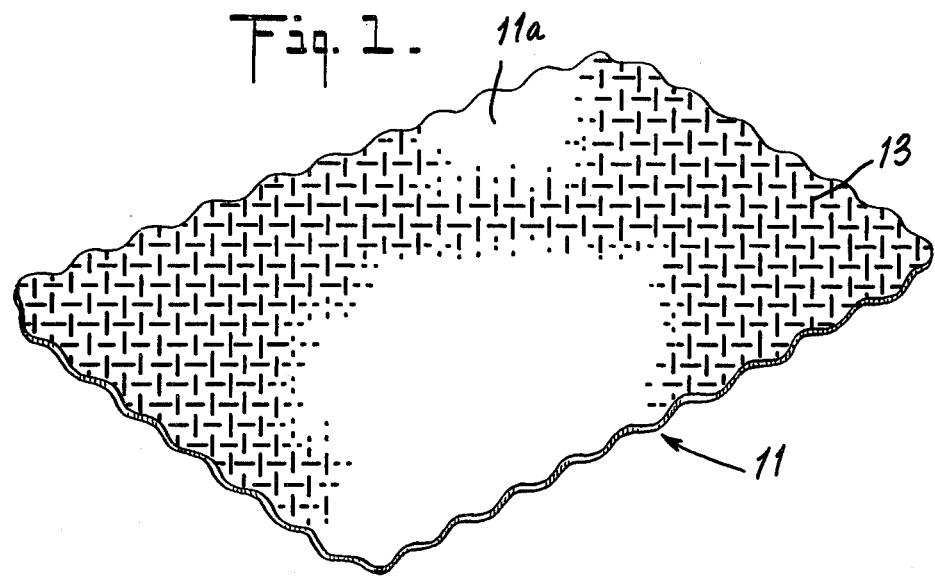
Fig. 1.
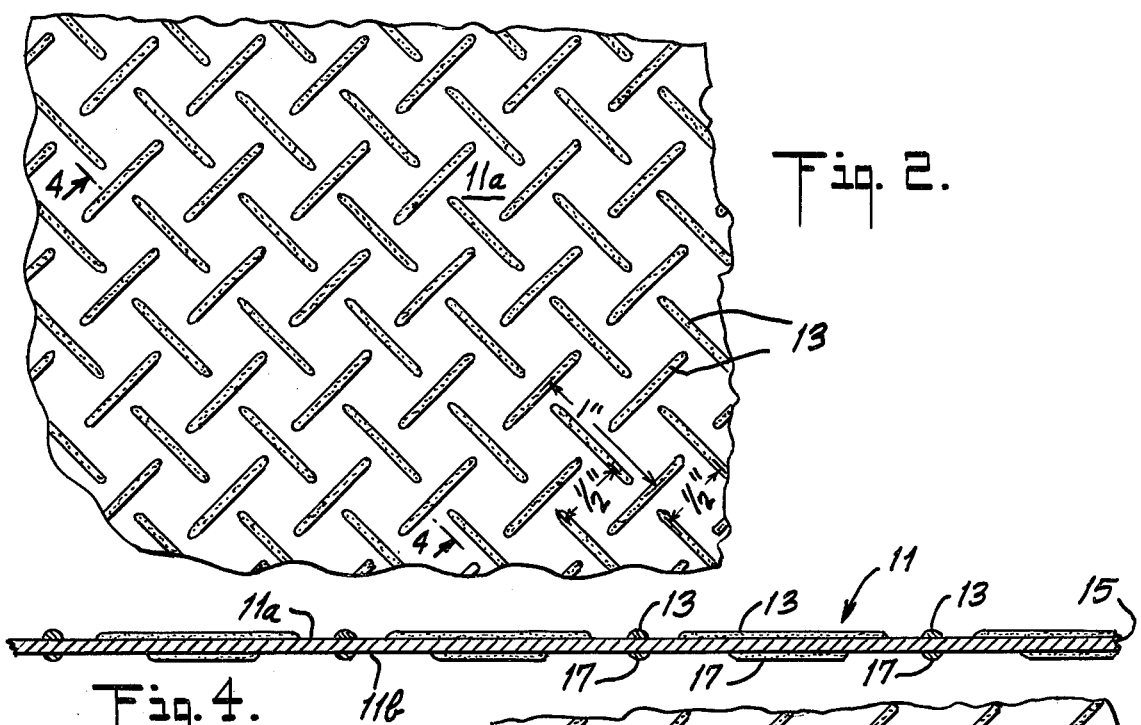
Fig. 2.
Fig. 4.
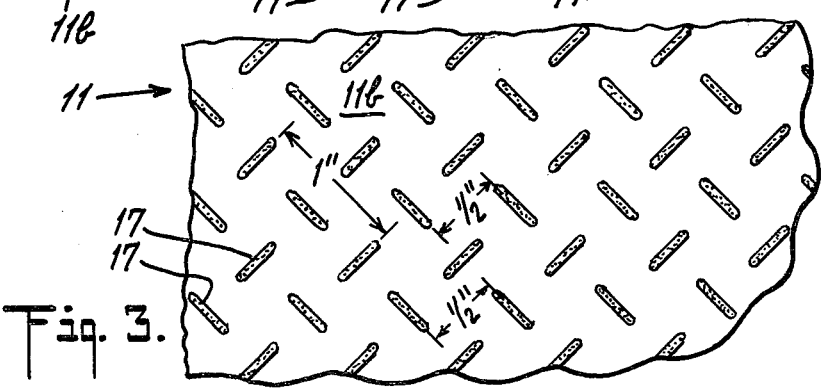
Fig. 3.

NON-SKID PLACE MAT AND THE LIKE

BACKGROUND OF THE INVENTION

Inexpensive, disposable place mats, coasters and the like are in widespread use in the food service industry. In such use it is particularly desirable to have a place mat, coaster or the like which will not slip or skid on the surface of a table or serving counter. It is further desirable to have a place mat, coaster or the like which resists slipping or skidding of objects placed thereon, such as glasses, cups, dishes and the like. This is especially desirable in those circumstances where the surface upon which the place mat is placed is not fixed or stationary, such as in an airplane or on a ship, or in situations where the person eating the food from the place mat or coaster has an unsteady or unsure grip, such as a child or an older person.

The subject invention relates to inexpensive place mats, coasters and the like having exceptional antiskid characteristics and particularly well suited for use in the food service industry under circumstances where such anti-skid characteristics are desired.

SUMMARY OF THE INVENTION

It is, accordingly, an object of this invention to provide articles of manufacture, such as place mats, coasters and the like, having exceptional anti-skid characteristics. Such articles are prepared by imprinting the top and bottom surfaces of a suitable flexible or deformable base member, such as a paper or plastic or plastic-coated paper sheet, with a material having a high coefficient of friction. The high-friction material is imprinted on the base member at discrete, spaced portions such that the imprinted material projects from the imprinted surface of the base member. The projections are aligned or disposed on the top and bottom surfaces of the base member in such a manner as to maximize the non-skid characteristics of the resulting place mat while minimizing the amount of material employed and accordingly the cost of the finished, high-friction place mat.

The novel features which are considered characteristic for the invention are set forth in particular in the appended claims. The invention itself, however, is best understood by reference to the following description of specific embodiments when read in connection with the accompanying drawings.

BRIEF DESCRIPTION OF THE DRAWINGS

FIG. 1 is a perspective view of a completed or finished place mat in accordance with one embodiment of the invention;

FIG. 2 is a fragmentary top view of the place mat of FIG. 1;

FIG. 3 is a fragmentary bottom view of the place mat of FIG. 1; and

FIG. 4 is a cross-sectional view along line 4—4 of FIG. 2.

DESCRIPTION OF THE PREFERRED EMBODIMENTS

Discussing the drawings in detail, and referring firstly to FIG. 1, there is shown an exemplary article according to the present invention, namely place mat 11. Depicted in FIG. 1 is top surface 11a of place mat 11, particularly projections 13 which are more clearly shown in FIG. 2. Projections 13 are made of or comprise material having a high coefficient of friction, such as material having a roughened or presenting a discontinuous, pitted surface. In a preferred embodiment of the invention, high-friction projections 13 are made of or comprise foamed material, see U.S. Pat. No. 3,864,418, which may include incorporated therein various additives, fillers and adhesives, see U.S. Pat. No. 3,994,764. The disclosures of these patents are herein incorporated and made part of this disclosure.

Projections 13 are imprinted upon the top surface of a suitable base member or substrate which is capable of being flexed or distorted or deformed, but intended in use to lie flat, such as a sheet of paper or plastic. In a preferred embodiment of the invention, base member 11 is paper, e.g., #16 Bond paper. The imprinting of projections 13 is accomplished using conventional machines which apply the high-friction material forming projections 13 under conditions such that the imprinted material, i.e., projections 13, is joined to or becomes fixed to or substantially integral with the surface of base member 11 upon which projections 13 are imprinted.

A particular disposition of projections 13 from the top surface of the base member has been found to be especially effective in imparting anti-skid characteristics to a place mat providing the same. This especially effective disposition or arrangement of projections 13 is seen in FIG. 2, wherein projections 13 are shown to be substantially rectangular in shape, e.g., measuring about ¾ inch by 1/16 inch. Projections 13 are imprinted and aligned in rows angled with respect to the edges of the article, as shown on the place mat depicted in FIGS. 1 and 2. Each projection 13 is disposed within its row so that it is perpendicular to its nearest projection, as illustrated in FIGS. 1 and 2. One set of separate parallel rows of projections 13 is aligned in one direction and projections 13 of this one set are interrupted or separated-in-line by projections 13 of another set of separate, also parallel, rows of projections 13, said other set of projections 13 being aligned or disposed so that its projections are transverse or perpendicular to the projections of the first-mentioned said one set and are disposed such that the projections of said other set come between the projections of said first-mentioned one set. Stated more succinctly, the spaced-apart projections of one set are separated by the spaced-apart projections of the other set, the spaced-apart projections of said other set being disposed in line transversely with respect to projections of the first-mentioned one set.

The disposition of projections 13 shown in substantially actual size in FIG. 2 has been found to be particularly effective in imparting anti-skid and anti-slip characteristics to the top of a base member, such as paper having such projections. The disposition or arrangement or projections 13 on the top of the base member or place mat reduces slipping or skidding of glasses, dishes, and the like placed thereon.

FIG. 3 depicts bottom surface 11b of place mat 11 and bottom projections 17 are shown extending therefrom. Projections 17 measuring about ⅜ inch by 1/16 inch, about one-half the size of projections 13, comprise or are made of substantially the same type of high-friction material as projections 13, and are similarly imprinted.

The disposition of projections 17 is shown in substantially actual scale in FIG. 3, and projections 17 are arrayed as are projections 13 on top of surface 11a. This disposition or array has been found to be especially effective in imparting anti-skid and anti-slip characteristics to bottom 11b of a suitable base member, such as paper, and in reducing slipping or skidding of the place mat on the surface on which the place mat is placed.

FIG. 4, a cross-sectional view along line 4—4 of FIG. 2, shows top projections 13 and bottom projections 17 imprinted upon the top surface 11a and bottom surface 11b, respectively, of place mat 11 made up of suitable substrate material 15, such as paper.

In one particularly desirable embodiment of the invention, substrate material 15 making up place mat 11 is #16 Bond paper with top projections 13 and bottom projections 17 being made up of a foamed polymer composition of U.S. Pat. No. 3,864,181. This particular embodiment not only possesses exceptional anti-skid or anti-slip characteristics but also overcomes several problems associated with the manufacture of such articles. For example, articles, such as place mats in accordance with this particular embodiment, do not stick together during production and/or packaging. Finally, articles in accordance with this embodiment have both better non-skid characteristics than they would if the entire surfaces were covered and are also less expensive to produce because of the reduced use of high-friction material.

As indicated hereinabove, it is preferred to employ as the imprinted material making up the projections which are imprinted or otherwise provided on the top and bottom surface of the substrate, e.g., place mats or coasters, so as to impart non-skid properties to the surfaces thereof the foamed compositions disclosed in U.S. Pat. No. 3,864,181. This patent discloses polymeric compositions capable of being imprinted on a substrate, such as a place mat, and foamed in situ thereon to provide an imprinted coating, such as the projections imprinted on the place mats and coasters in accordance with this invention, which after foaming provides a porous, disrupted or discontinuous, roughened or pitted surface. This surface provides a high-friction or non-skid surface and such properties to the imprinted substrate, e.g., paper place mats or coasters.

Various materials are disclosed in U.S. Pat. No. 3,864,181 as being useful for preparing the printable coating material which, after printing or during printing, is capable of being foamed in situ on the coated or printed substrate. Suitable such materials include foamable thermoplastics, e.g., polyethylene, polystyrene, polyvinyl chloride, etc. There are also provided in such compositions other materials such as microspheres and a solvent for the polymer but which is a non-solvent or has a limited solubility for the microspheres. Microspheres, preferably polyvinylidene microspheres, employed in the compositions are hollow plastic particles having a diameter in the range about 0.5 up to 200 microns. Other materials are also usefully incorporated in the compositions and include fillers, dyes, pigments, adhesives, etc. Upon printing, the resulting polymer composition is foamed in situ by heating to cause the expansion of the microspheres to yield the high-surface area, high-friction, non-skid printed material or projections.

As will be apparent to those skilled in the art in the light of the foregoing disclosure, many modifications, alterations, and substitutions are possible in the practice of this invention without departing from the spirit or scope thereof.

What is claimed is:

1. An article useful as a place mat, coaster or the like comprising:

a flat or planar sheet of paper; a plurality of discrete, spaced first projections extending from the top surface of said paper, said first projections consisting essentially of foamed thermoplastic polymeric material providing a high coefficient of friction;

a plurality of discrete, spaced second projections extending from the bottom surface of said sheet of paper, said second projections consisting essentially of foamed thermoplastic polymeric material providing a high coefficient of friction;

said first and second projections being substantially integral with said top and bottom surfaces, respectively, of said sheet of paper and being arranged and aligned as illustrated in FIGS. 2 and 3, respectively, of the drawings.

2. An article in accordance with claim 1 wherein the foamed thermoplastic polymeric material making up said first and second projections is selected from the group consisting of polyvinylidene chloride, a copolymer of vinylidene chloride and acrylonitrile in the weight ratios of from about 100:1 to about 70:30, copolymers of acrylonitrile and methyl acrylate in the weight ratios of from about 90:10 to about 80:20 and copolymers of methacrylonitrile and methyl acrylate in the weight ratios from about 93:7 to about 82:18.

* * * * *